United States Patent [19]
Visek

[11] Patent Number: 4,509,475
[45] Date of Patent: Apr. 9, 1985

[54] RECIPROCATING INTERNAL COMBUSTION ENGINE

[75] Inventor: Tomas Visek, Steyr, Austria

[73] Assignee: Steyr-Daimler-Puch Aktiengesellschaft, Vienna, Austria

[21] Appl. No.: 584,487

[22] Filed: Feb. 28, 1984

[30] Foreign Application Priority Data

Mar. 3, 1983 [AT] Austria .................................. 730/83

[51] Int. Cl.³ ............................................... F16M 1/02
[52] U.S. Cl. ............................ 123/195 A; 123/198 E; 180/312; 248/666
[58] Field of Search ............ 123/195 R, 195 C, 195 S, 123/195 A, 195 H, 198 E; 180/311, 312; 248/666

[56] References Cited

U.S. PATENT DOCUMENTS 2,208,750 7/1940 DeLong .......................... 123/195 C
3,060,902 10/1962 Hoenick .......................... 123/195 R
3,207,142 9/1965 Gorissen et al. ................ 123/195 R
4,257,370 3/1981 Kasting ........................... 123/195 C

FOREIGN PATENT DOCUMENTS 3216318 12/1982 Fed. Rep. of Germany .

*Primary Examiner*—Craig R. Feinberg
*Assistant Examiner*—David A. Okonsky
*Attorney, Agent, or Firm*—Karl F. Ross; Herbert Dubno

[57] ABSTRACT

A reciprocating internal combustion engine comprises an engine block, which includes the cylinders, cylinder heads, pistons, connecting rods, a crankshaft and main bearings for the crankshaft. The engine block is oil-tightly mounted in an outer pan and is held in said outer pan by supporting elements which are provided at both end faces of the engine block and insulate against a transmission of structure-borne sound. The engine block is sealed at the top edge portion of the outer pan only by an oil seal. The supporting elements are coaxial to the crankshaft. To minimize the transmission of vibration to the supporting elements which insulate against the transmission of structure-borne sound, said supporting elements are connected to the engine block by holders, which extend below the cylinders and are secured to the engine block approximately in the middle of the region traversed by the piston heads between their top and bottom dead center positions.

8 Claims, 3 Drawing Figures

RECIPROCATING INTERNAL COMBUSTION ENGINE

BACKGROUND OF THE INVENTION

Figure 1:
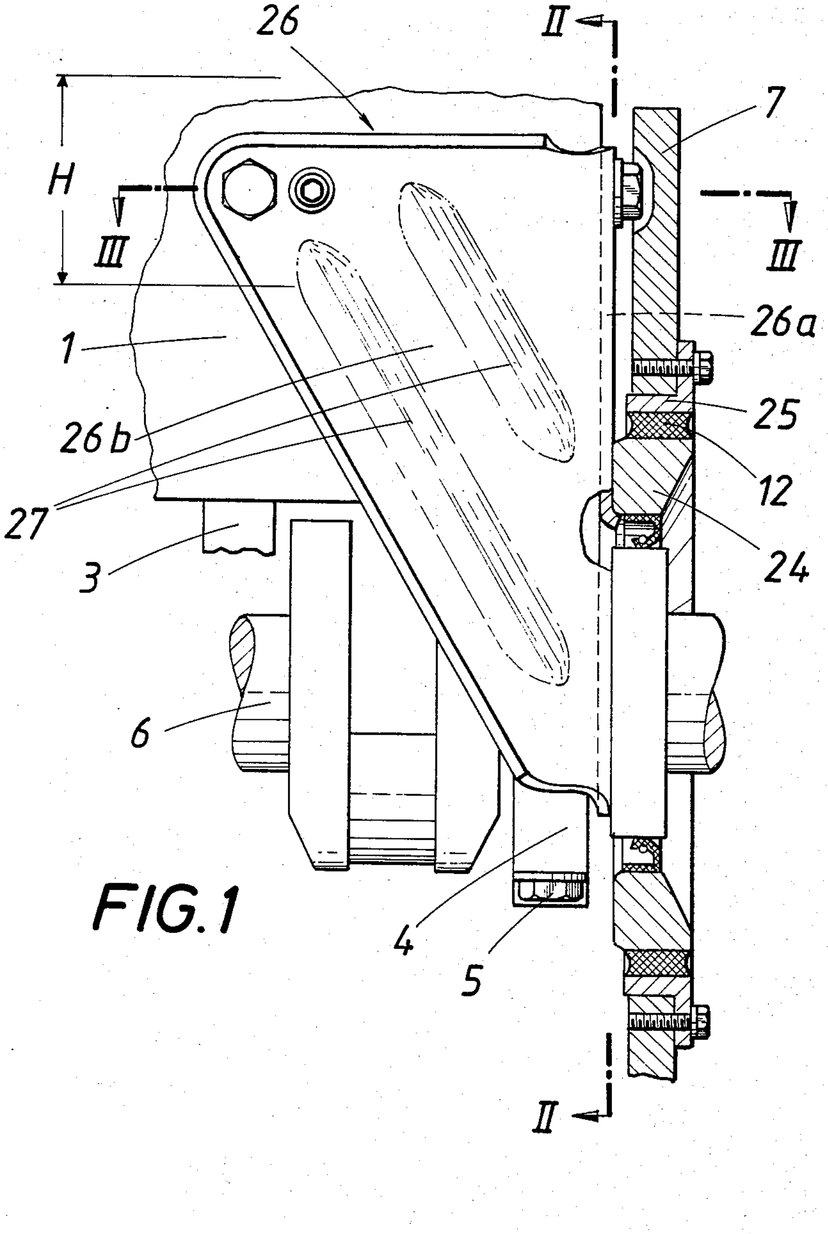

This invention relates to a reciprocating internal combustion engine comprising an engine block, which includes cylinders, cylinder heads, pistons, connecting rods, a crankshaft and the mainshaft bearings for the crankshaft, and which is inserted in an oiltight manner and with the aid of annular supporting elements insulating against a transmission of structure-borne sound in an outer pan, which consists of two parts connected by screws, wherein the engine block is held at its two ends in the outer pan by means of the supporting elements, which are coaxial to the crankshaft and insulate against a transmission of structure-borne sound, and is sealed to the top edge portion of the outer pan only by an oil seal.

Such internal combustion engine is already known from Laid-open German Application No. 28 01 431. In that known engine the annular supporting elements are screw-connected to the two outer crankshaft main bearings, which are obviously included in the engine block. It has now been found that the amplitude of the vertical vibration which is generated in the engine block as a result of the forces which are due to the combustion increases in upward and downward directions from a zone which is disposed approximately midway between the top and bottom dead center positions of the piston heads. That increase is due, inter alia, to the fact that the dimensions of the crankshaft main bearings are necessarily smaller than those of the cylinder block. A particularly large amplitude of vibration occurs in the U-shaped lower parts of the crankshaft main bearings because relatively large deformations of material must be expected in that region. The bending of the crankshaft under the combustion pressure results in a bending of the crankshaft main bearings, which protrude downwardly from the cylinder block, and this results also in a horizontal vibration in the axial direction of the crankshaft. In such an arrangement the supporting elements which insulate against a transmission of structure-borne sound are secured in the very region in which the vertical and horizontal vibrations occurring in the engine block as a result of the forces that are due to the combustion have a large amplitude. A certain improvement in this respect is afforded by the proposal contained in Laid-open German Application No. 28 01 431 to secure the supporting elements only to the upper parts of the crankshaft main bearings. In any case, in view of the large amplitudes of vibration the supporting elements must meet high requirements regarding the preventing of the transmission of said vibrations to the outer pan.

It is already known from Laid-open German Application No. 32 16 318 to provide holders which are secured to the engine block and mount the supporting elements which insulate against a transmission of structure-borne sound. But in accordance with that proposal the holders are secured to the engine block adjacent to the crankshaft and the supporting elements are disposed laterally of the engine block on the outside of the latter.

It is an object of the invention so to improve a reciprocating internal combustion engine of the kind described first hereinbefore that the supporting elements will reliably insulate in any case against a transmission of structure-borne sound.

This object is accomplished in accordance with the invention in that holders for the supporting elements which insulate against a transmission of structure-borne sound are provided and that said holders extend downwardly from the cylinders and are secured to the engine block approximately in the middle of the region between the top and bottom dead center positions of the piston heads.

Because the supporting elements which insulate against a transmission of structure-borne sound are no longer secured to the outer crankshaft main bearings but are provided with separate holders, which are connected to the engine block in a region thereof in which the vertical vibrations generated by the forces that are due to the combustion do not yet have an appreciable amplitude, virtually no vibration of that kind will be transmitted to the supporting elements and a transmission of such vibration to the outer pan is virtually impossible. Similar remarks are applicable to the horizontal vibration because the supporting elements are not in contact with the outer crankshaft main bearings.

A particularly desirable design will be achieved if each holder is channel-shaped and comprises a web engaging the adjacent end face of the engine block and flanges which are screw-connected to the longitudinal side faces of the engine block and each of the supporting elements which insulate against a transmission of structure-borne sound is secured to the web of the associated holder. To ensure an adequate strength of the holders, which preferably consist of sheet metal, stiffening beads may be formed in the flanges of each holder.

An illustrative embodiment of the invention is shown on the drawing, in which

Figure 2:
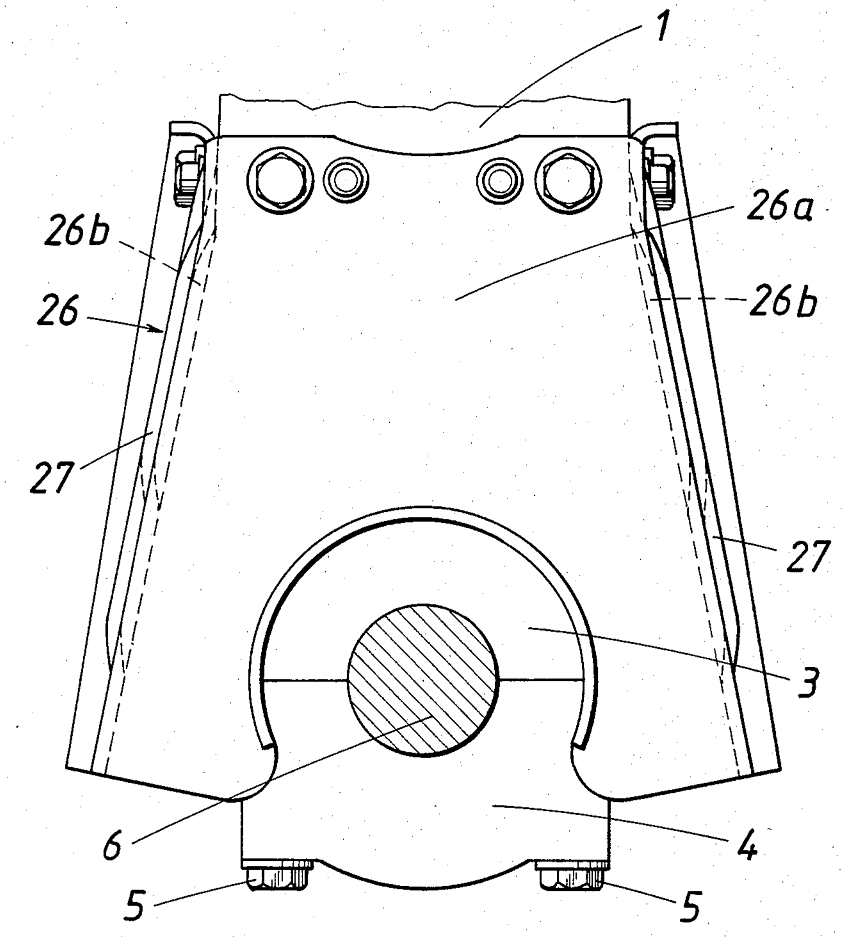
Figure 3:
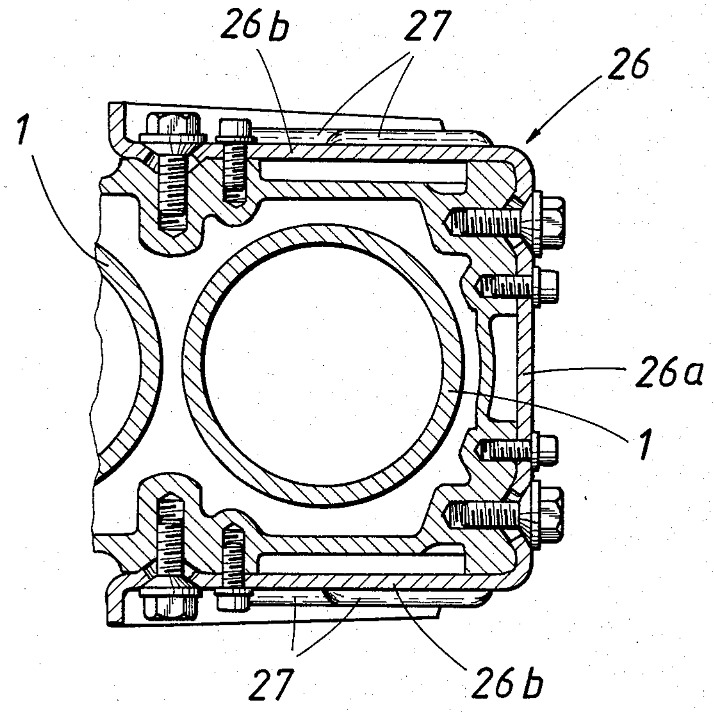

FIG. 1 is a fragmentary vertical sectional view showing one end of the engine block of a reciprocating internal combustion engine and the means for mounting said engine block in the outer pan, FIG. 2 is a transverse sectional view taken on the vertical plane indicated by the line II—II in FIG. 1 and FIG. 3 is a transverse sectional view taken in the horizontal plane indicated by the line III—III in FIG. 1.

The cylinders 1 and the cylinder heads, not shown, are included in an integral structure, to which the upper parts 3 of the crankshaft main bearings 3, 4 are secured by means of screws 5. The crankshaft 6, the connecting rods and pistons, not shown, the main bearings 3, 4, the cylinders 1 and the cylinder heads together constitute the engine block, in which the cylinders 1 extend above the crankshaft main bearings 3, 4. That engine block is mounted in an outer pan 7 by means of annular supporting elements 12, which are coaxial to the crankshaft 6 and insulate against a transmission of structure-borne sound. Only one end wall of the outer pan 7 is shown in FIG. 1. An oil seal, not shown too, is provided between the upper edge portion of the outer pan 7 and the engine block.

In accordance with the invention the supporting elements 12, which insulate against a transmission of structure-borne sound and which are disposed between and adhesively joined to an inner ring 24 and an outer ring 25, are mounted on the engine block by means of holders 26, which extend downwardly from the cylinders 1. These holders 26 are connected by screws to the engine block only substantially above the crankshaft main bearings 3, 4, specifically to the cylinders 1, approximately in the middle of the height of the region H traversed by the piston heads between their top and bottom dead center positions and below the abovementioned oil seal. Each holder 26 is channel-shaped (FIG. 3) and comprises a web 26*a*, which is secured by screws to the end face of the engine block or to the end of the bank of cylinders 1, and flanges 26*b*, which are screw-connected to the longitudinal side faces of the engine block or the bank of cylinders 1. Each supporting elements 12 for insulating against a transmission of structure-borne noise is secured to an associated web 26*a* by means of the interposed inner ring 24. The flanges 26*b* may be provided with stiffening beads 27.

In the reciprocating internal combustion engine described with reference to the drawing, a transmission of vibration from the engine block to the supporting elements 12 is minimized because the supporting elements 12 are connected to the engine block by holders 26 secured to the engine block in the region H in which the vertical vibration generated by the forces which are due to the combustion in the cylinder 1 has the smallest amplitude and because the supporting elements 12, the inner and outer rings 24, 25, and the holders 26 are clear of the crankshaft main bearings 3, 4.

What is claimed is:

1. In a reciprocating internal combustion engine comprising an outer pan, an engine block mounted in said outer pan and including crankshaft main bearings defining an axis, a crankshaft mounted in said main bearings for rotation on said axis, and cylinders extending above said crankshaft main bearings, and annular supporting elements which insulate against a transmission of structure-borne sound and are adjacent said engine block at both ends thereof and disposed within said outer pan extending beyond said outer pan towards said engine block and centered on said axis, the improvement residing in that said supporting elements are connected to said engine block solely by holding means, which are secured to said engine block only substantially above said crankshaft main bearings.

2. The improvement set forth in claim 1 as applied to a reciprocating internal combustion engine in which said engine block comprises pistons having piston heads and slidable in said cylinders between top and bottom dead center positions, and connecting rods operatively connecting said pistons to said crankshaft, wherein said holding means are secured to said engine block only approximately in the middle of the region traversed by said piston heads between said top and bottom dead center positions.

3. The improvement set forth in claim 1 as applied to a reciprocating internal combustion engine in which said outer pan has an upper edge portion and said engine block is oiltightly sealed against said upper edge portion only by an oil seal extending between said engine block and said upper edge portion.

4. The improvement set forth in claim 1 wherein said supporting elements and said holding means are clear of said crankshaft main bearings.

5. The improvement set forth in claim 1 as applied to a reciprocating internal combustion engine in which said engine block comprises above said crankshaft main bearings a region in which vertical vibration generated by forces which are due to the combustion in said cylinders has the smallest amplitude, wherein said holders are secured to said engine block only in said region.

6. The improvement set forth in claim 1 as applied to a reciprocating internal combustion engine in which said engine block has mutually opposite end faces and mutually opposite longitudinal side faces between said end faces, wherein said holding means comprises two channel-shaped holders, each of which comprises a web adjacent to one of said end faces and two flanges screw-connected to respective ones of said longitudinal side faces above said crankshaft main bearings, and each of said supporting elements is secured to the web of one of said holders.

7. The improvement set forth in claim 6, as applied to a reciprocating internal combustion engine in which said engine block comprises pistons having piston heads and slidable in said cylinders between top and bottom dead center positions, and connecting rods operatively connecting said pistons to said crankshaft, wherein said holding means are secured to said engine block only approximately in the middle of the region traversed by said piston heads between said top and bottom dead center positions.

8. The improvement set forth in claim 6, wherein said web of each of said holders is secured to the adjacent end face of said engine block above said crankshaft main bearings.

* * * * *